United States Patent [19]
Li et al.

[11] Patent Number: 5,468,429
[45] Date of Patent: Nov. 21, 1995

[54] ULTRASOUND-ENHANCED DEVOLATILIZATION OF THERMOPLASTIC PLASTICS

[76] Inventors: Tzu-Li Li, 2F, No. 100 Wan-An St., Hsin-Chung City, Taipei; I-Chung Tung, 136-3, Ln. 89, Kaung-Fu Rd., Sec. 1, Hsinchu, both of Taiwan; Duncan Yu, M-37, 44 Center Grove Rd., Randolph, N.J. 07869

[21] Appl. No.: 228,199

[22] Filed: Apr. 15, 1994

[51] Int. Cl.$^6$ .............................. B01D 1/26; B29B 13/08
[52] U.S. Cl. ................ 264/442; 159/900; 159/DIG. 10; 159/17.4; 264/102; 264/211.23; 264/349; 425/203; 425/205
[58] Field of Search ................... 264/101, 102, 264/23, 349, 211.23; 159/2.2, 2.3, 17.1, 900, DIG. 10, 17.4; 425/812, 203, 205

[56] References Cited

U.S. PATENT DOCUMENTS

| | | | |
|---|---|---|---|
| 3,325,386 | 6/1967 | Jurschewitz | 264/23 |
| 3,663,668 | 5/1972 | Fairbanks | 264/23 |
| 3,799,235 | 3/1974 | Moosavian et al. | 159/DIG. 10 |
| 3,992,500 | 11/1976 | Kruder et al. | 264/102 |
| 4,094,942 | 6/1978 | Nakai et al. | 264/102 |
| 4,197,268 | 4/1980 | Anders | 264/40.1 |
| 4,198,265 | 4/1980 | Johnson | 159/2.2 |
| 4,578,455 | 3/1986 | Pipper et al. | 528/501 |
| 4,636,084 | 1/1987 | Kopernicky | 366/76 |
| 4,793,954 | 12/1988 | Lee et al. | 264/23 |
| 4,902,455 | 2/1990 | Wobbe | 264/40.7 |
| 4,952,672 | 8/1990 | Moore et al. | 528/481 |
| 5,084,134 | 1/1992 | Mattiussi et al. | 159/DIG. 10 |
| 5,130,070 | 7/1992 | Martin | 264/102 |

FOREIGN PATENT DOCUMENTS

| | | | |
|---|---|---|---|
| 138523 | 11/1979 | Germany | 264/23 |

OTHER PUBLICATIONS

A. Tukachinsky et al., "Ultrasound-Enhanced Devolatilization of Polymer Melt", AIChE J. 39:359–360 (1993).
R. W. Foster et al., "Bubble Growth Controlled Devolatilization in Twin-Screw Extruder", Polym. Eng. Sci. 29:178–185 (1989).

*Primary Examiner*—Mathieu D. Vargot

[57] ABSTRACT

A method which includes a flashing process and a process for extruding thermoplastic plastics is provided for achieving more thorough devolatilizing of the solutions of thermoplastic plastics, to ensure that the solutions of thermoplastic plastics are able to be worked continually, wherein the accoustic treatments are introduced into both processes to increase the efficiency of removing volatile components and thus leads to the decrease of the processing time for extruding thermoplastic plastics. In the flashing process, the ultrasonic horns are arranged to scatter the feed stream of the solution which increases the devolatilizing surface of the polymer fluid and, simultaneously, to enhance bubble formation and produce strong agitation in the polymer fluid, thereby increasing the devolatilizing efficiency. In the process of extruding thermoplastic plastics, the ultrasonic horns are arranged in the extruder to enhance both formation and rupture of bubbles, thereby increasing the devolatilizing efficiency.

3 Claims, 2 Drawing Sheets

ULTRASOUND-ENHANCED DEVOLATILIZATION OF THERMOPLASTIC PLASTICS

BACKGROUND OF THE INVENTION

This invention relates to a method of improving the efficiency of removing the volatile components, such as unreacted monomers, solvents, low molecular weight components, water and dissolved gases, from the thermoplastic plastics, e.g. polystyrene, polymethyl methacrylate, styrene-acrylonitrile copolymer, etc. The method consists of two processes: a flashing process, the polymer solutions are first devolatilized at atmospheric pressure; a process for extruding the polymers, which is the so-called extrusion devolatilizer, the polymers are devolatilized in a single- or twin- or multi- screw extruder (hereafter referred to as an "extruder"), wherein a plurality of devolatilizing (covering the sense of degassing) sections are connected in series with one another. In both devolatilizing processes the accoustic treatments are applied to increase the devolatilizing efficiencies.

Extruders capable of extremely efficient devolatilizing are required for use in the preparation of bulk thermoplastic plastics, both for legal reasons and for the reasons of economy. Hence, the input thermoplastic solution which is discharged from the polymerization reactor must be devolatilized from a volatile content of up to about 90% by weight to a content of 50–1000 ppm, depending on the polarities and boiling points of monomers and low molecular weight components which decide the case of removal of monomers and low molecular weight components. As is often the case, of the volatile components, monomers and low molecular weight components are more difficult to be removed and contribute to the large part of the residual volatile components in the final extruded bulk products.

By referring to a recent article, Foster et al., "Bubble Growth Controlled Devolatilization in Twin-Screw Extruders", there are three sections of devolatilization that are defined. The first section of devolatilization is a flashing process in which the preheated polymer solution at the temperatures well above the normal boling points of the volatile components is fed into a vessel with an atmospheric pressure outlet. Subsequently, the solution stream is represurized and rehomogenized by the rotating screws and carried foward through the feed opening into the extruder. The second section of devolatilization, situated physically behind the feed point, is commonly referred to as the rear vent section, whereas the following section, being the first vent downstream from the feed point, is referred to as the first vent section. It is anticipated that the devolatilization is associated with a process of bubble formation, growth and rupture.

With the extension of the above definition, the second vent downstream from the feed point is referred to the second vent section of devolatilization.

In general, in the vent sections, by means of reducing the diameter of the screw core, an extra free volume is created in the screw channel, that is to say, the screw channel is partially filled by the extruded materials, whereby the internal pressure in the screw channel is substantially reduced. In this way, the devolatilizing process can be carried out in each vent section in which the volatile materials aggregate and form bubbles and subsequently diffuse through the polymer fluids with the aid of agitation and escape to the surrounding atmosphere. Furthermore, if the vents are operated under vaccum, the higher efficiencies of removing volatile components will be obtained.

In order to further increase the efficiency of extrusion devolatilization performance, the accoustic treatments are introduced into the devolatilizing sections. The beneficial effects of using the accoustic treatments can be expressed in two ways; first, the ultrasonic waves propagating in the polymer fluid may induce profuse bubble formation immediately, and produce agitation to aid the aggregation of the volatile components to the bubbles, namely, the growth of the bubbles, thereby increasing the efficiency of removing the volatile components. Second, the ultrasonic waves produce a high-frequency stretch-compression stress field which is powerful to break bubbles floating on the surface of the polymer fluid, whereby in the srew channel the evaporation of volatile components remaining in the bubbles can be accelerated as well as a reduced internal pressure can also be mantained.

For the purpose of reducing the total volatile components to below 50–1000 ppm with a shorter processing time and permitting the plastic solution conveyed from the solution polymerization reactors to be worked continually by the extruders, it is thus desirable to introduce the accoustic treatments into extrusion devolatilization processes.

SUMMARY OF INVENTION

It is an object of the present invention to provide a method for achieving more thorough devolatilizing of the polymer solution with a suitably short processing time in an extruder to ensure that the input thermoplastic solution can be worked continually. In the method in accordance with the invention, it has been found that good devolatilizing of the thermoplastic materials to be worked continually by the extruders can be achieved by the introduction of the accoustic treatments into the devolatilizing processes. In accordance with the invention, the ultrasonic horns which generate the ultrasonic waves are suitably placed in the devolatilizing processes in such a way that the efficiency of removing the volatile materials in the polymer can be increased: in the flashing process, the commercially available ultrasonic horn is arranged to scatter the feed stream of the solution which increases the air-polymer fluid interface and to favor bubble formation and produce strong agitation in the polymer fluid, thereby increasing the efficience of removing volatile materials; in the rear vent section, the ultrasound is used to expedite both formation and rupture of bubbles, while it is only used to favor bubble formation in the first vent section.

DESCRIPTION OF A PREFERRED EMBODIMENT

Figure 1:
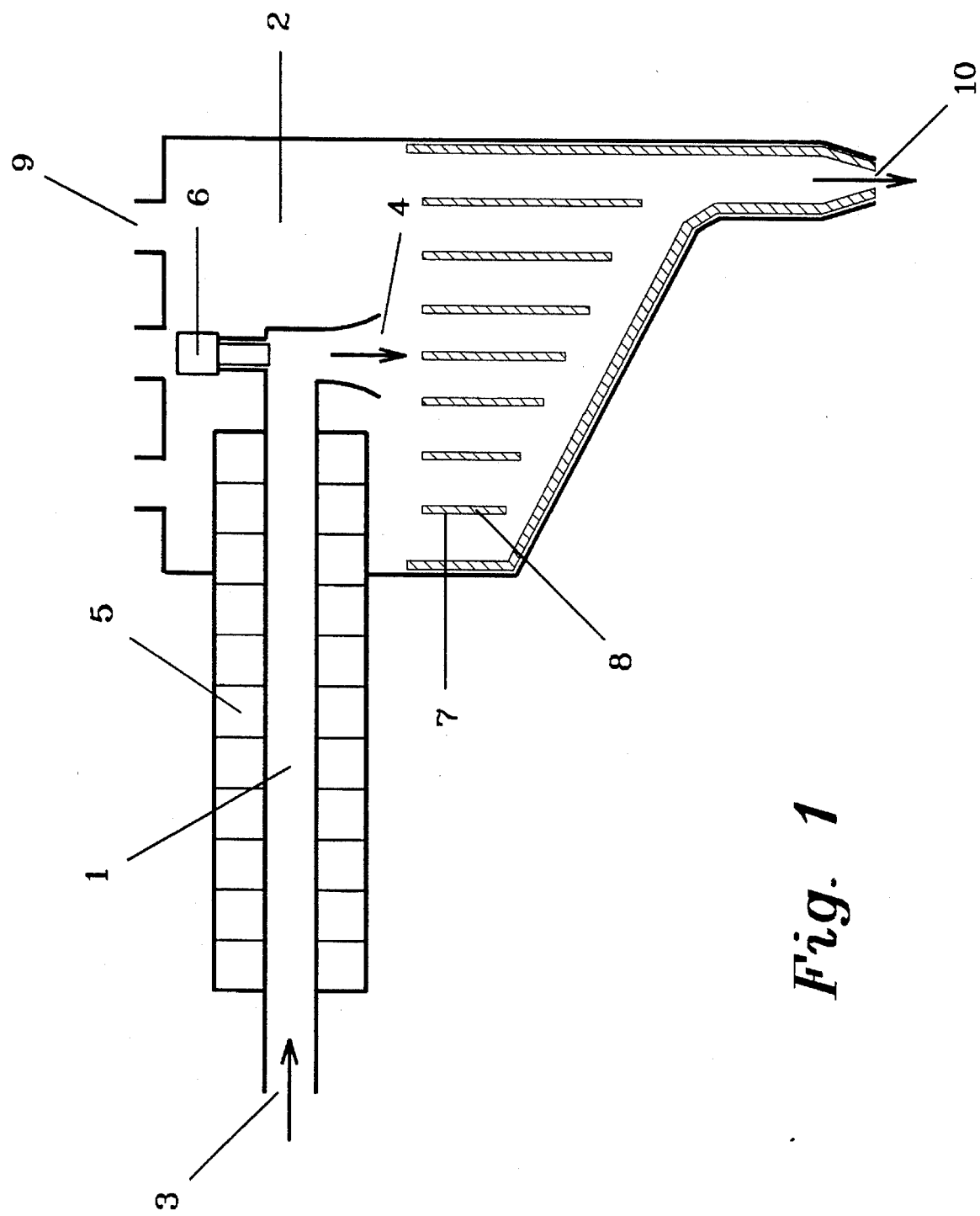
FIG. 1 is a schematic representation of a cross sectional side view of a flash seperation vessel.

As can be seen in FIG. 1, a heatable zone 1 which is attached to a flash seperation vessel 2 can be any type of tube having an inlet 3 and an outlet 4 and is heatable by any conventional heating means 5, such as by steam pipes or by electric heaters. The polymer solution which is preheated in the polymerization reactor (not shown) under a pressure greater than the saturation pressure of the volatile components at the prevailing temperature is pumped, typically a gear pump (not shown), to the heatable zone 1 in which the solution temperatures can be kept above the normal boiling points of the volatile components. At the outlet of the heat exchanger 4, an ultrasonic horn with high power output (e.g. 1000 watts or larger) 6 is attached so that the polymer solution can be splashed down to the verticle heating plates 7 in which the internal heating means 8 is generally common, such as an electric resistance coil heater or a hot oil heater.

As soon as the polymer solution leaves the outlet of the heat exchanger 4, the volatile components are evaporated under atmospheric pressure which is created by making some openings 9 on the top of the vessel 2. Due to the aid of ultrasound generated by the horn 6, a lot of bubbles form immediately in the polymer solution which is then scattered toward the verticle heating plates 7. This leads to the considerable increase of the area of the air-polymer solution interface to volume ratio of the solution, including the surfaces both of bubbles in the solution and of solution drops and/or strands, in other words, which is equivalent to the increase of the devolatilizing surface of the polymer solution, whereby the devolatilizing efficiency is greatly incresed. As the solution drops and/or strands flow along the surfaces of the heating plates 7 by gravity, the solution is heated again to the temperature above the melting point of the polymer in the solution but below the temperature at which the polymer suffers significant degradation in such a way that the volatile components continue to evaporate and the high-viscosity solution keeps flowable and descends to the outlet 10 of the vessel 2.

Figure 2:
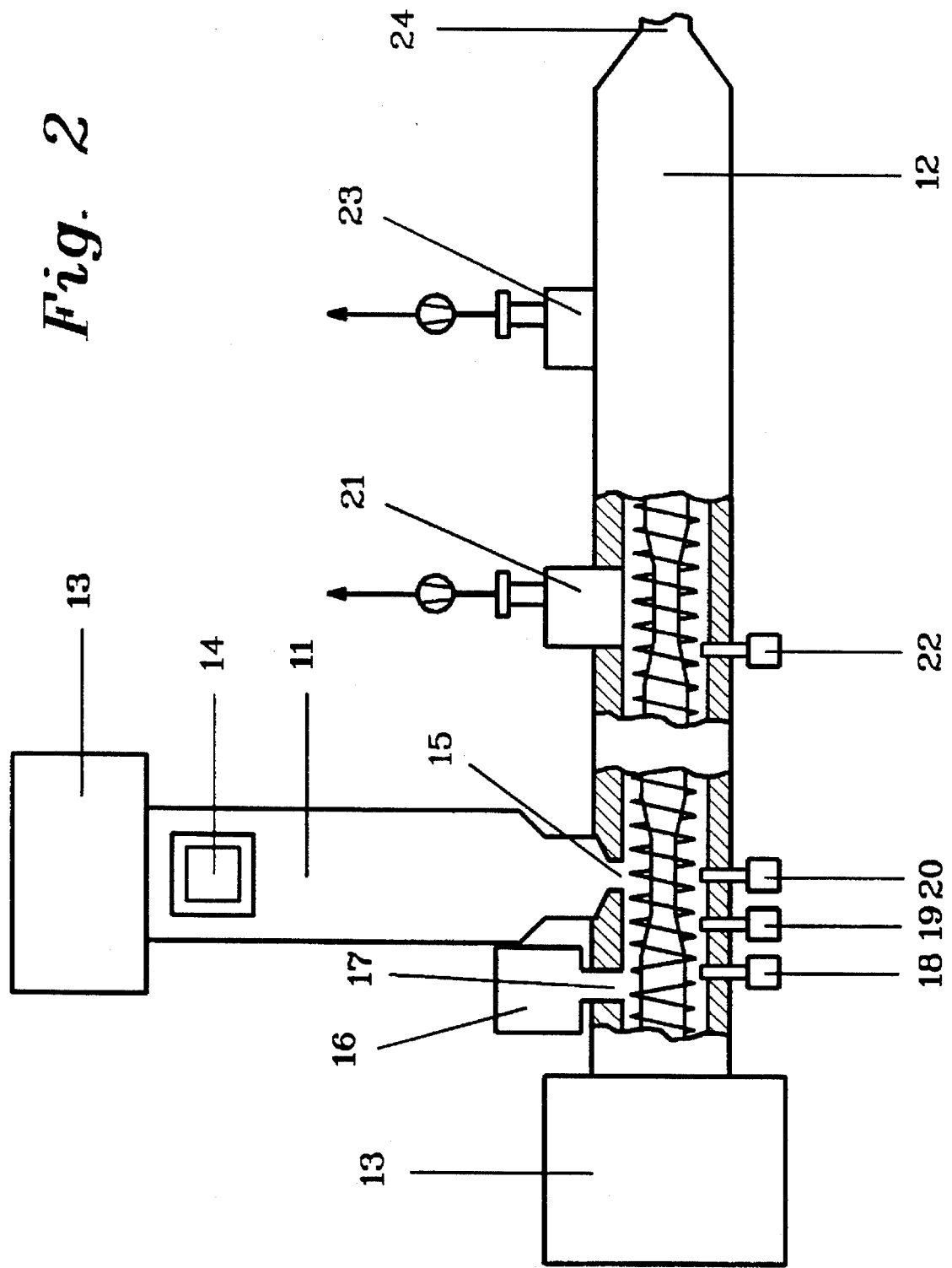
FIG. 2 is a schematic plan view of extrusion apparatus wherein the ultrasonic horns are suitably placed.

Illustrated schematically in FIG. 2 are two rotary screw extruders including the first extruder 11 and second extruder 12 which are assembled in an L-shaped configuration. Each of the extruders comprises a casing having a cylindrical bore and having an inlet and a discharge end and an extruder screw which is rotatable in the cylindrical bore of the casing and is driven by drive means 13 located at the end of the casing opposite the discharge end. After entering the first extruder 11 through the feed hopper 14, as the first extruder 11 is fixedly attached to the second extruder 12, the concentrated polymer solution is repressurized and rehomogenized and carried forward through the inlet 15 into the second extruder 12.

In the vicinity behind the inlet 15 of the second extruder 12, vacuum equipment 16 with an opening 17 is provided in the casing of the second extruder 12 so as to apply a vacuum there. Also, as can be seen in FIG. 2, three ultrasonic horns (with high power output) 18, 19 and 20 are provided and disposed in the vicinity of the inlet 15. Operation of the vacuum equipment 16 in combination with the ultrasonic horns 18, 19 and 20 to remove volatile materials procceds essentially as follows. After passing the inlet 15, the polymer solution partially fills the screw channel, which can be controlled by the feed rate of the polymer solution, namely, by the rotation speed of the screw in the first extruder 11, whereby in the screw channel a reduced pressure can be achieved and thus the formation and release of bubbles becomes possible. The horn 18 is provided to aid bubble formation, while the horns 19 and 20 are provided to break bubbles which float on the surface of the polymer solution and thus to accelerate the release of the vapors which are then drawn off by the vacuum equipment 16. In general, the bubbles tend to aggregate together and attach to the surface of the polemer solution, which produces a back pressure to the polymer solution and thus leads to the increase in the internal pressure of the screw channel, thereby significantly decreasing the efficiency of devolatilization. Based on this recognization, the horns 19 and 20 are therefore installed and used to remedy this drawback.

As travelling foward and arriving in the vicinity of the first vent 21, the resulting polymer melt is devolatilized there by a reduced pressure in the screw channel. As can be seen in FIG. 2, an ultrasonic horn 22 is provided and disposed behind the vent (which is located in the vicinity upstream from the vent) to help initiate bubble formation. Subsequently, the polymer melt is propelled foward and passed the second vent 23 to the discharge end 24 of the second extruder 12.

What is claimed is:

1. A method for devolatilizing thermoplastic polymer solutions comprising the following steps in sequence:

(i) passing a preheated thermoplastic polymer solution through a heatable zone to maintain a solution temperature which is above the normal boiling points of volatile components and below the boiling point of said polymer in said solution;

(ii) scattering down said solution at an outlet of said heatable zone disposed in a vessel, by means of force produced by ultrasonic horns and gravity, to a plurality of vertical heating plates whose temperature is maintained above the melting point of said polymer but below the temperature at which said polymer suffers significant degradation, while the devolatilization of said polymer solution proceeds under atmospheric pressure;

(iii) flowing said solution along the surfaces of said vertical heating plates toward an outlet of said vessel by gravity and then into a feed inlet of a first extruder, which feed inlet of said first extruder is connected to said outlet of said vessel;

(iv) operating said first extruder to extrude said solution into a feed inlet of a second extruder, each of said first and second extruders having a casing with a cylindrical bore, a feed inlet, a discharge end and a plurality of openings and an extruder screw which is rotatable in said cylindrical bore of said casing and is driven by drive means located at the end of said casing opposite said discharge end, while the rotation speed of said screw of said first extruder is suitably controlled so that the screw channel is partially filled by said polymer solution in the vicinity of said feed inlet of said second extruder, which feed inlet of said second extruder is connected to said discharge end of said first extruder;

(v) allowing volatile components to escape through one of said openings on said casing which is located in the region between said feed inlet and said drive means of said second extruder and connected to vacuum means for producing reduced presssure therein, and in said region a plurality of ultrasonic horns are disposed for producing sonic or ultrasonic vibrations in said solution;

(vi) propelling said solution forward toward said discharge end of said second extruder;

(vii) allowing volatile components to escape through a first one of said openings downstream from said feed inlet of said second extruder, around which a plurality of ultrasonic horns are disposed for producing sonic or ultrasonic vibrations in said solution;

(viii) allowing volatile components escape through each of the remaining openings on said casing of said second extruder, wherein each of the remaining openings is any opening located between said first one of said openings and said discharge end of said second extruder, around which a plurality of ultrasonic horns for producing sonic or ultrasonic vibrations in said solution can also be disposed to increase devolatilizing efficiency; and (ix) discharging said polymer from said discharge end of said second extruder at a volatile content or less than 1000 ppm.

2. The method of claim 1, wherein said thermoplastic polymer is selected from the group consisting of polyolefins, polystyrene, polyvinyl chloride, polyester, polyurethanes, polyamides, polyacrylates, polymethacrylates, polycarbonates, polyetherimides, polyphenylene oxides, polyphenylene ethers, and blends thereof.

3. The method of claim 1, wherein said heatable zone can also be connected to a plurality of outlets in said vessel, at each of which are a plurality of ultrasonic horns for scattering down said solution.

* * * * *